(No Model.)
Æ. F. NUTTALL.
DOG COLLAR.
No. 426,137. Patented Apr. 22, 1890.
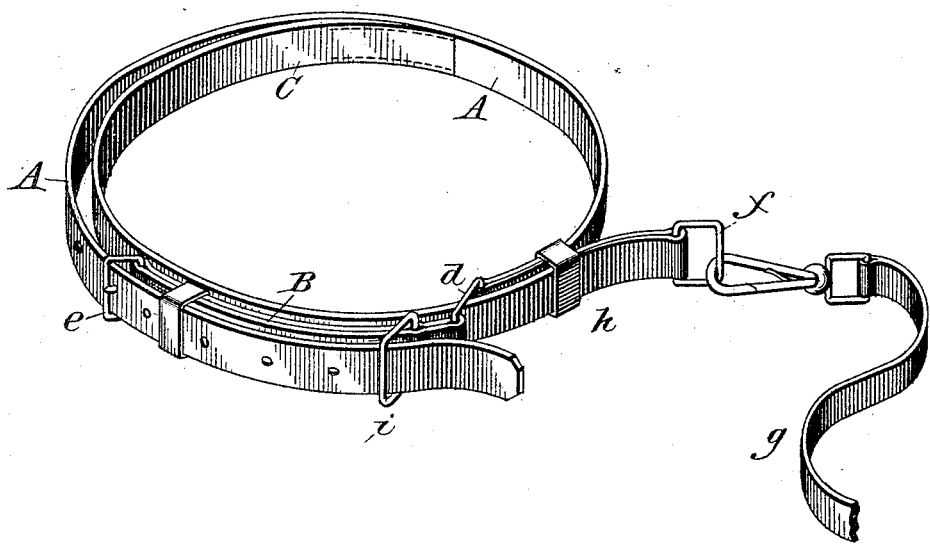

UNITED STATES PATENT OFFICE.

ÆNEAS FALKINER NUTTALL, OF DUBLIN, IRELAND.

DOG-COLLAR.

SPECIFICATION forming part of Letters Patent No. 426,137, dated April 22, 1890.

Application filed July 8, 1889. Serial No. 316,896. (No model.) Patented in England May 9, 1889, No. 7,769.

*To all whom it may concern:*

Be it known that I, ÆNEAS FALKINER NUTTALL, gentleman, a citizen of Great Britain, residing at 30 Arnott Street, Dublin, Ireland, have invented a new and useful Dog-Collar, (for which I have obtained a patent in Great Britain, No. 7,769, bearing date May 9, 1889,) of which the following is a specification.

The object of my improved collar is to prevent a dog slipping his head through it when tied up or being led.

In the accompanying drawing I have shown a collar of the description embodying my invention. It consists of three parts, and is a combination of an ordinary collar and one that will tighten to any degree should a dog pull or try to get out of it, and yet is so contrived that not the least injury can occur by its use, as even the effort of breathing is sufficient to relieve the collar from any pressure or tightness around the throat.

The collar consists of three principal parts A, B, and C, A and B being united by a buckle-frame. $d$ forms the collar proper. Stitched to this, inside, is a second or slip collar C.

In adjusting the collar the end of the slip-collar C is first passed through the buckle-frame $d$. The end of the collar A B is then passed through the buckle $e$ at the end of the piece B, and is then fitted to the dog's throat, as required, and the tongue of the buckle fixed in the usual manner into any one of the holes in the collar, the end of which is then fastened as usual. When so adjusted, the inner collar C is free to slip or slide to and fro loosely through the buckle-frame $d$. The end of this second collar C is provided with a metal loop $f$, and to this the chain or strap $g$ is connected in the customary manner.

When the dog becomes troublesome by pulling or trying to slip the collar, the inner one C, being free to slip, tightens round the throat; but as soon as he ceases to struggle or resist it at once loosens. Even the action of breathing will free the throat from pressure. When the collar is not required for use in this manner, the strap or chain $g$ is removed from the end $f$, which is then passed through the loop $h$, and the chain is attached to the loop $i$. The inner collar C is then inoperative.

Having fully described my invention, what I desire to claim and secure by Letters Patent is—

The combination, with a dog-collar consisting of the pieces A and B and having the bands $h$ and the buckle-frame $d$, of an auxiliary collar consisting of a single strap C, stitched at one end to the inside of the collar, and having its opposite end passed through the buckle-frame and band and free to move therein, whereby the said auxiliary collar will tighten when tension is exerted at the end thereof and relax when the tension is relaxed, as set forth.

ÆNEAS FALKINER NUTTALL.

Witnesses:
J. S. McCASKILL,
JNO. W. WORK.